United States Patent
Chung et al.

(10) Patent No.: US 6,507,696 B1
(45) Date of Patent: Jan. 14, 2003

(54) METHOD AND APPARATUS FOR PROVIDING ADDITIONAL DVD DATA

(75) Inventors: Hugo Yun Cheng Chung, Scarborough (CA); Peter Thomas Pownall, Willowdale (CA)

(73) Assignee: ATI Technologies, Inc., Ontario (CA)

( * ) Notice: Subject to any disclaimer, the term of this patent is extended or adjusted under 35 U.S.C. 154(b) by 0 days.

(21) Appl. No.: 08/935,549

(22) Filed: Sep. 23, 1997

(51) Int. Cl.$^7$ ............................................ H04N 5/781
(52) U.S. Cl. ...................................... 386/125; 386/126
(58) Field of Search .............................. 386/39, 45, 95, 386/96, 98, 125–126; 725/134, 139; 345/716, 719–722, 744, 764, 810, 854

(56) References Cited

U.S. PATENT DOCUMENTS 5,977,964 A * 11/1999 Williams et al. ............ 725/139
6,064,796 A * 5/2000 Nakamura et al. ............ 386/95
6,160,952 A * 12/2000 Minura et al. ............... 386/125
6,226,446 B1 * 5/2001 Murase et al. ................. 386/95

\* cited by examiner

Primary Examiner—Thai Tran
Assistant Examiner—Christopher Onuaku
(74) Attorney, Agent, or Firm—Vedder, Price, Kaufman and Kammholz

(57) ABSTRACT

A method and apparatus for displaying DVD and/or application data is accomplished by detecting selection of a user interaction request that is requesting the display of a DVD subpicture or an application subpicture. Once the user interaction request is detected, the system determines the particular type of the request; i.e., whether the request is for a DVD data stream or an application data stream. Note that the DVD data stream includes DVD video data, DVD audio data, and DVD subpicture data. Simliarly, the application data stream includes at least one of application video data, application audio data, and application subpicture data. When the user interaction request relates to the application data stream, the application data stream is displayed only or merged with the DVD data stream.

11 Claims, 4 Drawing Sheets

METHOD AND APPARATUS FOR PROVIDING ADDITIONAL DVD DATA

TECHNICAL FIELD OF THE INVENTION

This invention relates generally to DVD technology and more particularly to a method and apparatus for providing additional user interactive software with the DVD data content.

BACKGROUND OF THE INVENTION

DVD is a relatively new technology that is just beginning to emerge in the commercial market place. In general, a DVD player reads, via a laser reader, a DVD disk to extract digital video and digital audio. The DVD player converts the digital video and audio into signals that are readily presentable on a television set, home theater, or a computer. A typical DVD disk includes substantially more information than is contained on a normal VCR (videocassette recorder) tape. For example, a DVD disk stores video data that is based on MPEG 2 (moving picture expert group), digitized audio (e.g., AC3, PCM, or MPEG) that corresponds to the video data, and sub-picture data which includes on-screen buttons for selecting different video and audio options. The options include jumping to various chapters of the video content, viewing special scenes of the video content, hearing additional commentary of the video content (e.g., director's and/or editor's cuts and comments), and viewing the video content from different angles. To select one of these options, the user activates the sub-pictures, via a remote control, and then selects the particular option via an on-screen cursor.

To control the hardware aspect of the DVD player (e.g, volume, picture quality, pause, rewind, etc.) and the accompanying displaying device (e.g., television, home theater, computer) the hardware provides applications which present on-screen buttons for the user to alter the hardware applications. The software that generates the on-screen buttons is generated by the manufacture of the DVD player or accompanying displaying device. As such, the on-screen buttons for hardware control typically have a different appearance than the on-screen buttons contained on the DVD disk. In addition to the different appearance, a separate controlling device is needed to pop-up the on-screen buttons of the hardware and other DVD commands. Thus, for a user to fully control the presentation of a DVD video, the user requires two control mechanisms; one for the hardware of the DVD system and another for the DVD content on the disk.

Therefore, a need exists for a method and apparatus that integrates the hardware applications of the DVD player and displaying device and DVD video user interactive content of the DVD disk into a single user controlled mechanism.

DETAILED DESCRIPTION OF A PREFERRED EMBODIMENT

Generally, the present invention provides the method and apparatus for displaying DVD and/or application data. This may be accomplished by detecting selection of a user interaction request that is requesting the display of a DVD subpicture or an application subpicture. Once the user interaction request is detected, the system determines the particular type of the request; i.e., whether the request is for a DVD data stream or an application data stream. Note that the DVD data stream includes DVD video data, DVD audio data, and DVD subpicture data. Similarly, the application data stream includes at least one of application video data, application audio data, and application subpicture data. Further note that the DVD data stream and the application data stream may be at least partially encrypted.

When the user interaction request relates to the application data stream, the application data stream is displayed only or merged with the DVD data stream. With such a method and apparatus, a user, via a single control device, may evoke DVD data stream information (i.e., DVD video data, DVD audio data and DVD subpicture data) and/or application data stream (i.e., application video data, application audio data, and application subpicture data), which is done seamlessly with respect to the user.

Figure 1:
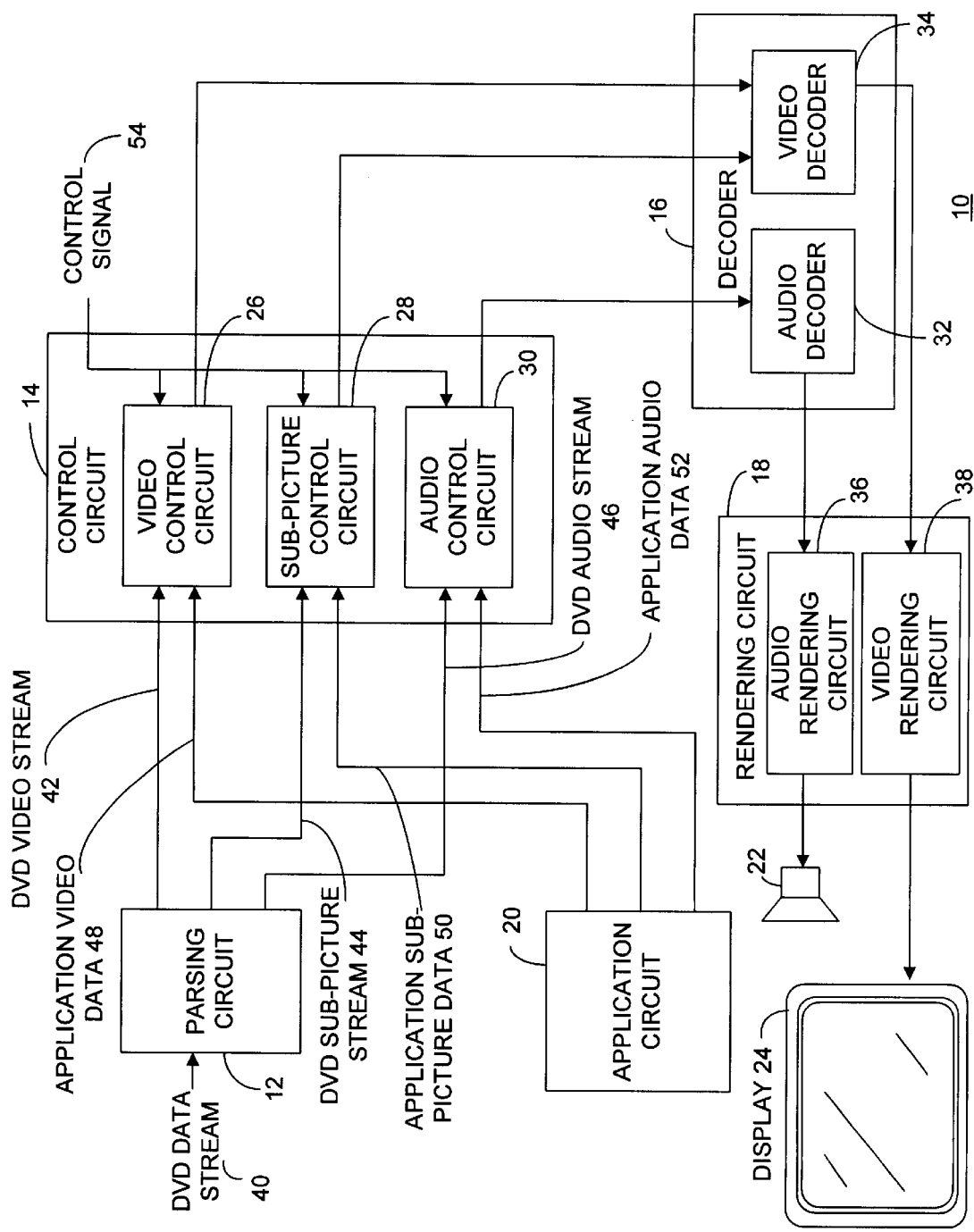
FIG. 1 illustrates a schematic block diagram of a video system in accordance with the present invention.

The present invention can be more fully described with reference to FIGS. 1 through 6. FIG. 1 illustrates a schematic block diagram of a video system 10 that includes a parsing circuit 12, a control circuit 14, a decoder 16, a rendering circuit 18, an audible system 22, and a video display 24. The parsing circuit 12, upon receiving a DVD data stream 40, parses it into a DVD video stream 42, a DVD subpicture data stream 44, and a DVD audio data stream 46. Parsing DVD data in this manner is consistent with the technology employed in the DVD players.

The control circuit 14 receives the DVD video stream 42, the DVD subpicture stream 44, and the DVD audio stream 46 in respective control circuits. For example, a video control circuit 26 receives the DVD video stream 42, a subpicture control circuit 28, receives the DVD subpicture stream 44, and an audio control circuit 30 receives the DVD audio stream 46. In addition to receiving the DVD signals, each of the respective control circuits 26–30 receives corresponding application data from the application circuit 20.

The application circuit 20 may be a memory circuit, such as RAM, ROM, floppy disk, CD-ROM, hard disk memory. The application circuit 20 stores applications of hardware functions such that when a user interaction request is detected (e.g., by detecting activation of a remote control, mouse, etc.), a corresponding application is retrieved from the application circuit 20. Alternatively, the application circuit 20 may be a state machine that generates the particular application data based on the particular user request. For example, if the user has requested a volume control change, the application circuit 20, if its a read-only memory, would retrieve from memory an application relating to changing the volume of the particular device that is displaying the DVD data stream. Alternatively, if the application circuit is a state machine, it would derive the necessary video buttons for changing the volume of the DVD player.

A control signal 54 is provided to each of the respective control circuits 26–30. The control signal 54 indicates that the respective control circuit is to pass the DVD data unaltered, pass the application data unaltered, or pass a combination of the application data and the video data to the decoding circuit 16. For example, if the user has requested displaying of DVD subpictures, the control signal 54 may indicate the selection of only the DVD subpictures, the DVD subpictures and the application subpictures; or, the DVD subpictures are to be altered and/or merged with the application subpictures. As one skilled in the art can readily ascertain from this discussion, the combination of manipulating the DVD data with the application data can be done in a multitude of ways.

The decoder 16 includes an audio decoder 32 and a video decoder 34. The video decoder 34 decodes the MPEG 2 encoded DVD data and subpictures as well as decoding the MPEG 2 encoded application video and application subpictures. The audio decoder 32 decodes AC3 encoded audio of the DVD audio and/or AC3 encoded application audio. The decoder 16 performs in a similar manner as to the decoder of a DVD player.

The rendering circuit 18, which includes an audio rendering circuit 36 and a video rendering circuit 38, receives the output of decoder 16. The audio rendering circuit 36 receives digitized audio from the audio decoder circuit 32 and converts it into an analog signal. The analog signal is then provided to the audio system 22, which may be a speaker, which renders the signal audible. The video rendering circuit 38 receives digitized video signals from the video decoder, processes it, and provides it to the display 24.

By including the control circuit 14 in the video system 10, a user is provided with a seamless mechanism for overwriting and/or merging, application video, audio, and subpictures with DVD video, audio, and subpictures. This can be done using a single input means, such as a remote control of a DVD player, a television, a home theater, or a keyboard, and/or mouse, of a computer. As such, the user will not know that the application options are distinct from the DVD information. For example, when the user activates a DVD menu, the present invention will display the DVD menu along with a corresponding application menu. The resulting menu may include an unaltered DVD menu, an altered DVD menu merged with an application menu, or only an application menu. Therefore, to the user, the application video, audio, and subpictures appear to be part of the DVD video, audio, and subpictures, which makes user activation of the DVD data content and/or the application data content easier.

Figure 2:
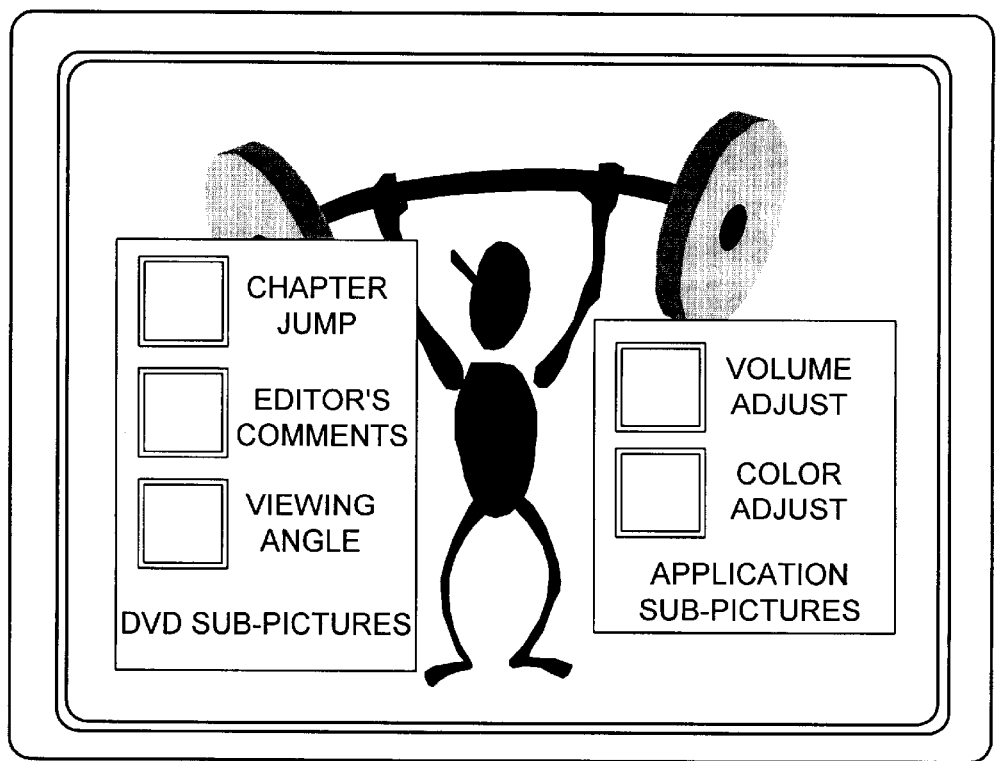
FIG. 2 illustrates a graphical representation of DVD subpictures and application subpictures in accordance with the present invention.

FIG. 2 illustrates a display 24 that includes a DVD subpicture menu and an application subpicture menu. The DVD subpicture menu includes a video button for chapter jump, a video button for editor's comments, and a video button for viewing angle. The application subpicture menu includes a video button for volume control and one for color adjustment. Once the user has evoked the DVD menu, via a single remote control device, mouse, or keyboard, both menus appear as separate menus.

With the menus on screen, the user may select one of the video buttons from the DVD menu using an input means (e.g., remote control, mouse, or keyboard) to activate the corresponding function. In an identical manner, the user may select one of the video buttons from the application menu to activate the corresponding function. Thus, when the user evokes the DVD menu, the application menu is also displayed. Thus, even though the DVD subpicture information comes from the DVD disk and the application subpicture information comes from the system, to the user, it appears that they came from the same source.

Figure 3:
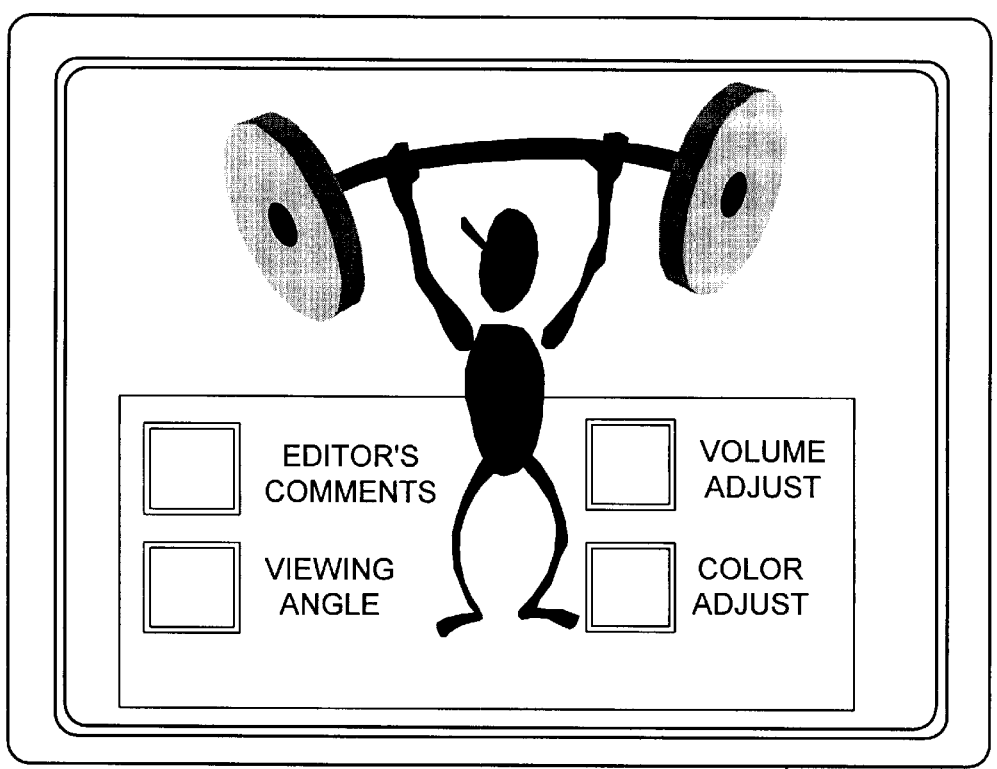
FIG. 3 illustrates a display illustrating video and application subpictures in accordance with the present invention.

FIG. 3 illustrates the display 24 illustrating an alternate version of displaying application subpicture menu and the DVD subpicture menu. As shown, the two menus have been merged into a single menu. The menu includes video buttons corresponding to editor's comments viewing angles, volume adjusts, and color adjusts, are shown in a single menu. Thus when the user selects the menu from his or her DVD controller, the menu shown in FIG. 3 will be displayed.

Figure 4:
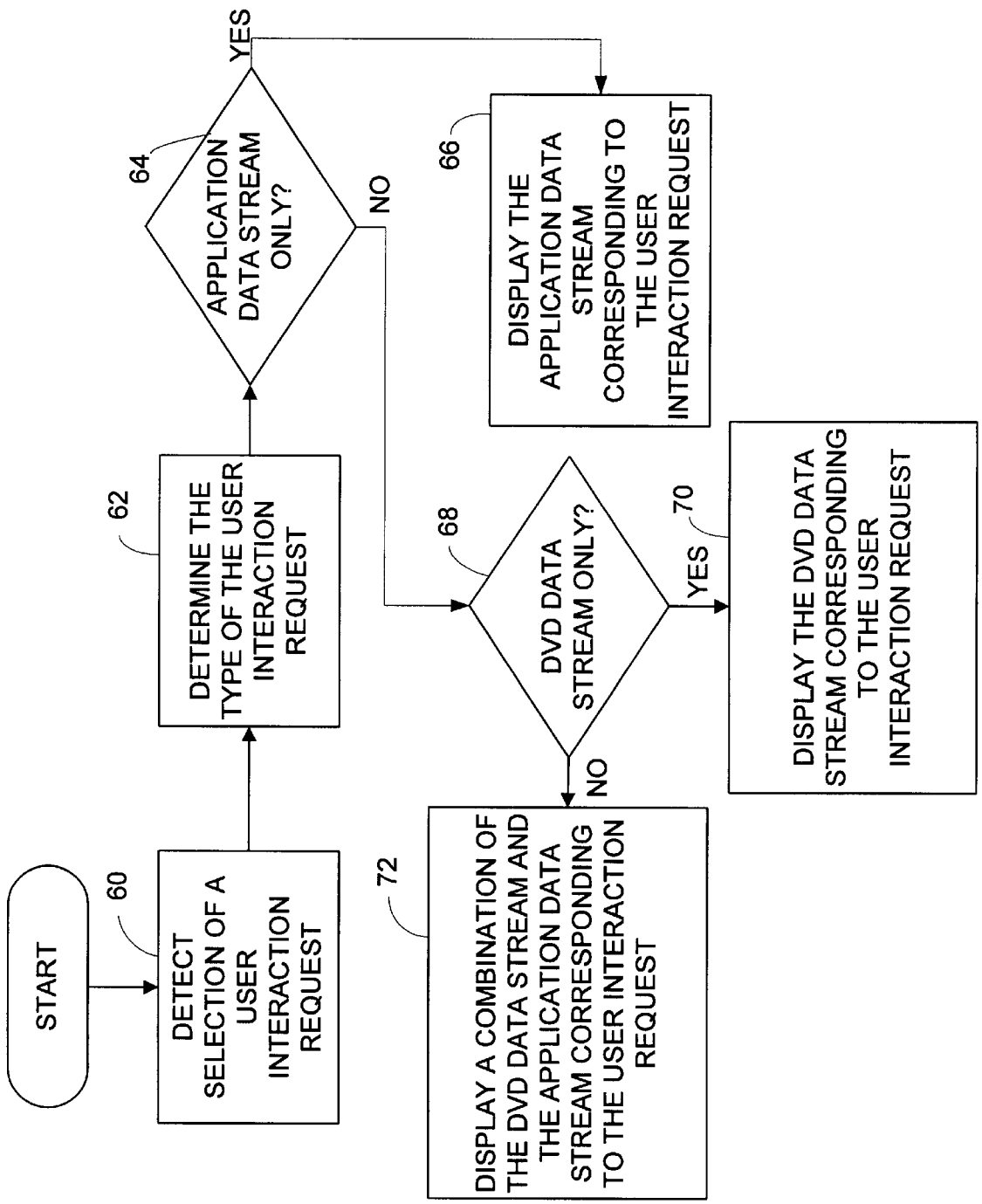
FIG. 4 illustrates a logic diagram of a method for displaying DVD and/or application data in accordance with the present invention.

FIG. 4 illustrates a logic diagram of a method for displaying DVD data and/or application data in a seamless single user function application. The process begins at step 60 where a selection of a user interaction request is detected. The user interaction request corresponds to the activation of a controlling device by a user. The controlling device may be a remote controller for the DVD player, a remote control for the television or home theater, or a keyboard. Regardless of which device is used, the process proceeds to step 62. At step 62, a determination is made as to the type of the user interaction request. The type of request indicates whether the DVD data is to be processed, the application data is to be processed, or the application and DVD data are to be processed together.

The process then proceeds to step 64 where a determination is made as to whether only application data stream is to be processed. If yes, the process proceeds to step 66 where the application data stream is displayed, wherein the application data stream corresponds to the user interaction request. The application data stream may be an audio data stream, a video data stream, and/or a subpicture data stream. In addition, the application data stream may be encoded data via an encryption technique or compression technique, or may be non-compressed data. When the application data stream is being presented, the application data stream may be an alteration to the background of the video display, may be an unchanged background with the application data being blended with the background section, or may be a combination of both.

If, the application data is not the only data to be presented, the process proceeds to step 68. At step 68, a determination is made as to whether only a DVD data stream is to be presented. If yes, the process proceeds to step 70 where the DVD data stream is displayed, wherein the DVD data stream corresponds to the user interaction request. Note that the DVD data stream may be an audio data stream, a video data stream, or a subpicture data stream.

If, however, application data and DVD data are to be presented, the process to step 72. At step 72, a combination of the DVD data stream and application stream is displayed, wherein the combination corresponds to the user interaction request. The combination of the DVD data stream and application data stream may be presented contemporaneously as separate video, as blended video, or displayed separately in separate sections of the display area. Note that the combination of the data may include navigation data of the DVD data stream, which is used to coordinate jumps in scenes, menus, or chapters, and is further used to add bookmarks of chapters, scenes, menus, etc.

Figure 5:
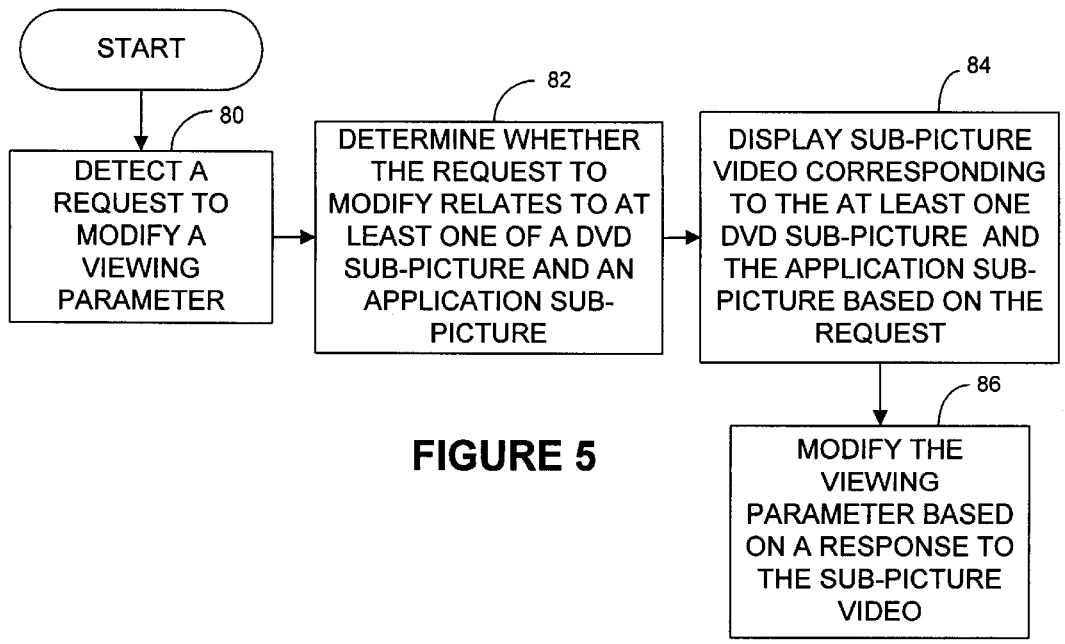
FIG. 5 illustrates a logic diagram for an alternate method for displaying DVD and/or application data in accordance with the present invention.

FIG. 5 illustrates a logic diagram of an alternate method for displaying DVD data and/or application data. The process begins at step 80 where a request to modify a viewing parameter is detected. The request to modify a viewing parameter may correspond to a current mode of a DVD player, where the current mode is a current setting of at least one of language, viewing angle, volume, chapter jumps, color, DVD content viewing options, and background content. The process then proceeds to step 82 where a determination is made as to whether the request to modify relates to at least one of a DVD subpicture and an application subpicture. If so, the process proceeds to step 84 where the subpicture video corresponding to the at least one of the DVD subpicture and the application subpicture is displayed based on the request.

The displaying at step 84 may replace the DVD subpicture with the application subpicture without replacing video content of the background. Alternatively, the displaying may add the application sub-pictlie to the DVD subpicture without replacing video content of the background. As another alternative, the displaying may replace the DVD sub-picture with the application sub-picture and replacing video content of the background, As yet another alternative, the displaying may add the application sub-picture to the DVD sub-picture and replacing the video content of the background. As yet another alternative, the displaying may add the application subpicture to the DVD subpicture and replacing the video content of the background.

Having displayed the subpictures, the process proceeds to step 86 where the viewing parameter is modified based on a response to the subpicture video. As an example, assume that the request to modify a viewing parameter was activated such that the user could view the DVD menu. Once the activation is detected, the process evokes both the DVD menu and an application menu. Once the DVD and application menus are displayed, the user may select one of the video buttons corresponding to any viewing parameter option, whether it was originally part of the DVD menu or the application menu. Once the particular viewing option has been selected, the system processes the request.

Figure 6:
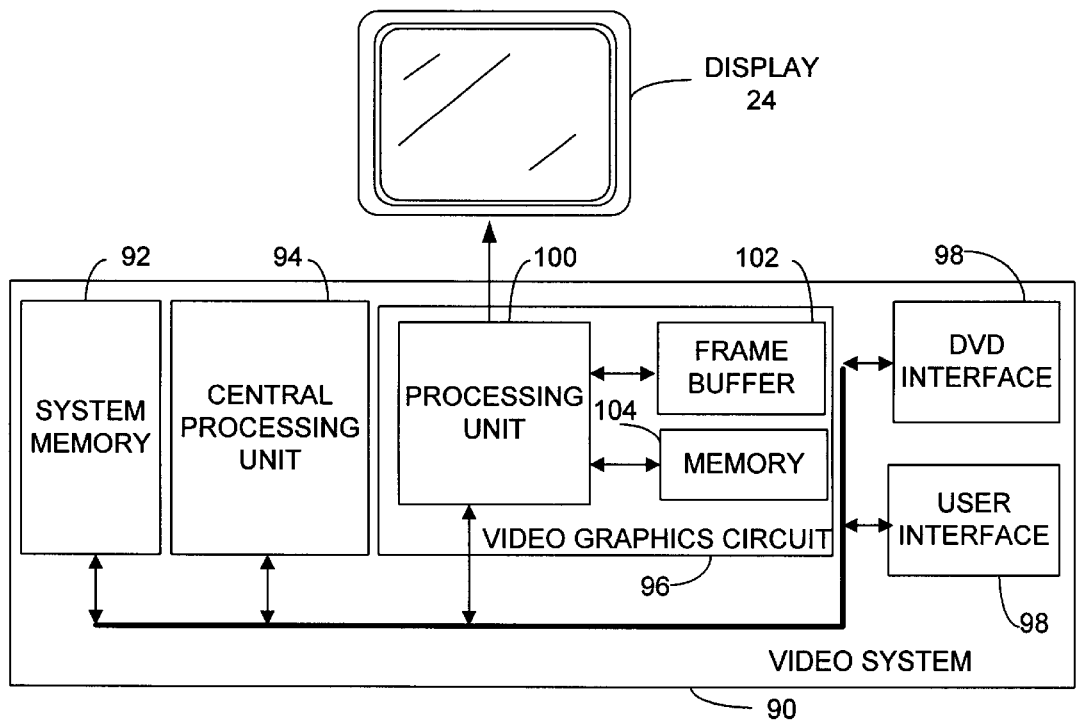
FIG. 6 illustrates a schematic block diagram of a video system in accordance with the present invention.

FIG. 6 illustrates another schematic block diagram of a video system 90 that includes system memory 92, a central processing unit 94, a video graphics circuit 96, a DVD interface 98, and a user interface 99. The system memory 92 may be any type of memory device such as read-only memory, random access memory, hard drive memory, floppy disk memory, or any other means for storing digital information which can be subsequently read or written. The central processing unit 94 may be part of a computer, television set, home theater, and may be a microprocessor, microcomputer, digital signal processor, or any other device that manipulates digital information based on programming instructions. The user interface 99 coordinates receipt of user option selections which may be received from a remote control, mouse, or keyboard. The DVD interface 98 interfaces the video system 90 with a DVD player.

The video graphics circuit 96 includes a processing unit 100, a frame buffer 102, and memory 104. The processing unit 100 may be a microprocessor, a microcontroller, a digital signal processor, a portion of the central processing unit 94 or any other device that manipulates digital information based on programming instructions. The memory 104 may be a read-only memory, random access memory, hard drive memory, floppy disk memory, or any other device that stores digital information. The memory stores programming instructions which, when read by the processing unit, causes the processing unit to perform the methods of FIG. 4 and 5.

Once the processing unit 100 has performed the methods of FIG. 4 or 5, the resulting video information is provided, as pixel information, to the frame buffer 102. The frame buffer stores, at a refresh rate of the particular screen, (e.g., 60 hertz for American television), the video content that is to be displayed. The processing unit 100 retrieves the pixel information from the frame buffer and subsequently provides it to the display 24.

The preceding discussion has presented a method and apparatus for providing additional DVD controls to a user via a single input response. As such, when a user evokes a DVD interactive request, the system displays not only the corresponding DVD request, the system also provides application data. The application data provides the user with many more options, which are controlled through a single device as opposed to multiple devices.

What is claimed is:

1. A method for providing additional DVD data stream, the method comprises the steps of:
   a) detecting a request to modify a viewing parameter;
   b) determining whether the request to modify relates to at least one of a DVD sub-picture and an application sub-picture;
   c) displaying sub-picture video corresponding to the at least one of the DVD sub-picture and the application sub-picture based on the request to modify; and
   d) modifying the viewing parameter based on a response to the sub-picture video.

2. The method of claim 1 further comprises, within step (a), detecting the request to modify a current mode of a DVD player, wherein the current mode corresponds to a current setting of at least one of: language, viewing angle, volume, chapter jumps, color, DVD content viewing options, and background content.

3. The method of claim 1 further comprises, within step (c), when the request to modify relates to the DVD sub-picture, replacing the DVD sub-picture with the application sub-picture without replacing video content of a background.

4. The method of claim 1 further comprises, within step (c), when the request to modify relates to the DVD sub-picture, adding the application sub-picture to the DVD sub-picture without replacing video content of a background.

5. The method of claim 1 further comprises, within step (c), when the request to modify relates to the DVD sub-picture, replacing the DVD sub-picture with the application sub-picture and replacing video content of a background.

6. The method of claim 1 further comprises, within step (c), when the request to modify relates to the DVD sub-picture, adding the application sub-picture to the DVD sub-picture and replacing video content of a background.

7. A video system comprises:
   a processing unit; and
   memory that is operably couple to the processing circuit, wherein the memory stores programming instructions that, when read by the processing unit, causes the processing unit to (a) detect a request to modify a viewing parameter; (b) determine whether the request to modify relates to at least one of a DVD sub-picture and an application sub-picture; (c) display sub-picture video corresponding to the at least one of the DVD sub-picture and the application sub-picture based on the request to modify; and (d) modify the viewing parameter based on a response to the sub-picture video.

8. The video system of claim 7 further comprises, within the memory, programming instructions that, when read by the processing unit, causes the processing unit to replace the DVD sub-picture with the application sub-picture without replacing video content of a background when the request to modify relates to the DVD sub-picture.

9. The video system of claim 7 further comprises, within the memory, programming instructions that, when read by the processing unit, causes the processing unit to add the application sub-picture to the DVD sub-picture without replacing video content of a background when the request to modify relates to the DVD sub-picture.

10. The video system of claim 7 further comprises, within the memory, programming instructions that, when read by the processing unit, causes the processing unit to replace the DVD sub-picture with the application sub-picture and replacing video content of a background when the request to modify relates to the DVD sub-picture.

11. The video system of claim 7 further comprises, within the memory, programming instructions that, when read by the processing unit, causes the processing unit to add the application sub-picture to the DVD sub-picture and replacing video content of a background when the request to modify relates to the DVD sub-picture.

* * * * *